(12) United States Patent
Min

(10) Patent No.: US 7,460,172 B2
(45) Date of Patent: Dec. 2, 2008

(54) FRAME INTERPOLATING METHOD AND APPARATUS THEREOF AT FRAME RATE CONVERSION

(75) Inventor: Jong-sul Min, Gyunggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 10/838,325

(22) Filed: May 5, 2004

(65) Prior Publication Data

US 2004/0227851 A1 Nov. 18, 2004

(30) Foreign Application Priority Data

May 13, 2003 (KR) .................. 10-2003-0030372

(51) Int. Cl.
*H04N 7/01* (2006.01)
(52) U.S. Cl. .................. 348/441; 348/459; 348/701
(58) Field of Classification Search ................ 348/441, 348/451–452, 459, 448, 699–701, 402.1, 348/413.1, 416.1–418.1; *H04N 7/01*
See application file for complete search history.

(56) References Cited

U.S. PATENT DOCUMENTS 5,995,154 A * 11/1999 Heimburger ................ 348/448

6,509,930 B1 * 1/2003 Hirano et al. ................ 348/452
6,900,846 B2 * 5/2005 Lee et al. .................... 348/459
7,042,512 B2 * 5/2006 Yang et al. .................. 348/452

FOREIGN PATENT DOCUMENTS

| JP | 6217263 A | 8/1994 |
| KR | 2002-0044715 A | 6/2002 |
| KR | 2002-0070772 A | 9/2002 |
| WO | WO 01/13647 A1 | 2/2001 |

OTHER PUBLICATIONS

Takahiko Hukinuki, "Multi-dimensional signal processing of TV image", Industrial Daily Paper Company, Nov. 15, 1998, p. 201-203.

* cited by examiner

*Primary Examiner*—Trang U Tran
(74) *Attorney, Agent, or Firm*—Sughrue Mion, PLLC

(57) ABSTRACT

Disclosed is a frame interpolating apparatus and a method thereof used at a frame rate conversion. The frame interpolating apparatus includes a calculation unit for performing a SAD Map calculation among inputted video signals with respect to a previous frame and a next frame and performing block matching, a determination unit for determining from the block-matched frame whether a video is repeated periodically and is changing fast, and an interpolation unit for selectively calculating a pixel value of an interpolated frame according to a determination result of the determination unit. Accordingly, the interpolated frame is vivid and clear, hence, removing the conventional blurring problem.

18 Claims, 4 Drawing Sheets

FRAME INTERPOLATING METHOD AND APPARATUS THEREOF AT FRAME RATE CONVERSION

CROSS-REFERENCE TO RELATED APPLICATIONS

This application claims the priority of Korean Patent Application No. 2003-30372, filed Mar. 13, 2003, in the Korean Intellectual Property Office, the disclosure of which is incorporated herein by reference.

BACKGROUND

1. Field of the Invention

The present invention relates to a frame interpolating method and an apparatus thereof at frame rate conversion in a field of video processing such as MPEG, and more specifically, to a method for determining whether an inputted video is repetitive, and if so, interpolating it to a pixel value in the same location of a previous frame and an apparatus thereof.

2. Description of the Related Art

A frame rate conversion (FRC) means converting the number of frames that are outputted per second. Generally, a frame rate is represented in Hz. For instance, when a motion picture having a frame rate 24 Hz is reproduced through a TV set having a frame rate of 30 Hz, a frame rate conversion is required due to the difference of the frame rates of each video signal. In the case when the frame rate is increased as in the above instance, the frames need to be interpolated.

In a field of video processing such as the Moving Picture Experts Group (MPEG) Standard, the video signal mostly has high autocorrelation to thereby cause redundancy. Hence, effective data compression can be obtained by removing the redundancy. At this time, in order to effectively compress time-varying video frames, it is required to remove the redundancy in two-dimensional space as well as in time.

The removal of the temporal redundancy is based on the idea that the amount of data to be transferred can be greatly reduced by replacing unchanged portions or moved-but-still-similar portions in the frames with their immediately preceding frames.

To do this, it is necessary to find the most similar block between a current frame and a preceding frame, in what is called "motion estimation," and indicating a displacement of how much the block is moved, i.e., "motion vector."

A typical method for estimating the motion vectors is a Block Matching Algorithm which takes into consideration precision, efficiency, real-time processability and hardware implementation.

The Block Matching Algorithm compares two consecutive videos such as a previous frame and a next frame, by block units and then estimates a motion based on a degree of matching of signal patterns. In the Block Matching Algorithm, estimation and compensation are carried out in a certain size, that is, in the unit of a set of M pixels in the horizontal direction and N pixels in the vertical direction, and the pixel set is called a "macroblock" which is represented as M×N.

By such Block Matching Algorithm, a motion vector is estimated with reference to the previous frame and the next frame, and a frame interpolation is carried out by using the estimated motion vector.

FIG. 1 is a diagram showing a motion estimation method by using the conventional Block Matching Algorithm. Frame A is a previous frame of an input video, frame C is a next frame of the input video, and frame B is a new frame interpolated using pixel values of the frames A and C. In FIG. 1, t1 indicates a time interval between the previous frame and the interpolated frame, and t2 indicates a time interval between the interpolated frame and the next frame.

Generally, the block matching at frame rate conversion is carried out in such a manner that a search area of the previous frame and the next frame is set based on a block of a certain size, sum of absolute difference (SAD) is compared within the search area, and a matching block between the previous frame and the next frame is found and used as motion information. The SAD is obtained by the equation below.

$$SAD = \sum_{i=0}^{M-1}\sum_{j=0}^{N-1} (|f_2(i, j) - f_1(i, j)|) \quad \text{[Equation 1]}$$

wherein, i, j denote coordinates of a pixel and f(i, j) denotes a pixel value of the pixel located at row i and column j. A subscript of f denotes a relevant frame. Typical search methods for searching the matching block are a full search algorithm and a 3-Step search algorithm. The full search algorithm has high performance but has complex hardware. The 3-Step search algorithm has simple hardware but has low performance. Hence, an appropriate algorithm is adaptively selected according to the desired system configuration.

In the frames having the time interval of FIG. 1, provided that an optimum motion vector obtained through a SAD value between the frame A and the frame C is referred to as MV, a motion vector from the frame B to the frame A is referred to as $MV_{BA}$ and a motion vector from the frame B to the frame C is referred to as $MV_{BC}$, which are obtained below.

$$MV_{BA} = -\frac{t_1}{t_1+t_2}mv = [dx_{BA}, dy_{BA}] \quad \text{[Equation 2]}$$

$$MV_{BC} = \frac{t_2}{t_1+t_2}mv = [dx_{BC}, dy_{BC}]$$

wherein, mv indicates unit motion vector [dx, dy].

According to the related art, in the case of a normal video at frame interpolation, a pixel value of the interpolated frame is determined by using the motion vector. That is, the pixel value $f_B(i, j)$ of the interpolated frame is obtained below.

$$f_B(i, j) = \frac{t_2 \times f_A(i+dx_{BA}, j+dy_{BA}) + t_2 \times f_C(i+dx_{BC}, j+dy_{BC})}{t_1+t_2} \quad \text{[Equation 3]}$$

In Equation 3, a pixel value of a frame to be interpolated is obtained using the motion vector from the frame B to the frame A and the motion vector from the frame B to the frame C. On the one hand, for fast changing, i.e., fast motion or repetitive motion video, there are difficulties in interpolating unlike normal video because the estimation of motion vector becomes difficult. In this case, according to the related art, the interpolation is carried out by using an average of pixel values of pixels that are in the same locations of the previous frame and the next frame. That is, in the case of such special video, the pixel value of the interpolated frame is obtained below.

$$f_B(i, j) = \frac{t_2 \times f_A(i, j) + t_s \times f_C(i, j)}{t_1+t_2} \quad \text{[Equation 4]}$$

In Equation 4, the pixel value $f_B(i, j)$ is obtained without using the motion vectors as in Equation 3.

According to the conventional motion estimation methods, the normal video is interpolated using the motion vector, and the special video is interpolated using the average of the previous video and the next video to thereby prevent the severe deterioration of the video. In the case of the fast video, i.e., the video having the fast changing pixel values, blurring of the video may occur in reproducing moving pictures, but the blurring matters little, as it is not very unpleasant to the eye.

However, in the case of repetitive video, blurring of the video occurs between the inputted video and the interpolated video. In addition, when watching the motion pictures, a luminance difference between a light area and a dark area is unpleasant to the eye.

SUMMARY

Accordingly, it is an aspect of the present invention to provide a frame interpolating method and an apparatus thereof for processing a repetitive or a periodically repeating video for a frame rate conversion according to a different algorithm that is not used for fast changing video to thereby prevent a degradation of the video quality.

The frame interpolating apparatus according to the present invention comprises a calculation unit, a determination unit and an interpolation unit. The calculation unit performs a SAD Map calculation among inputted video signals with respect to a previous frame and a next frame and performs block matching. The determination unit determines from the block-matched frame whether the video is repeated periodically and/or changing fast. The interpolation unit selectively calculates a pixel value of an interpolated frame according to a determination result of the determination unit.

In an exemplary embodiment, the determination unit further comprises a repetition pattern determination unit for determining whether a video has a repetition pattern by using a SAD value, a motion vector extraction unit for calculating a motion vector through the SAD value, and a fast changing video determination unit for determining whether the video is a fast changing video by using a value of the motion vector.

In the case of the video having the repetition pattern, the interpolation unit interpolates the video using the pixel value of the previous frame. In the case of the video changing fast, the video is interpolated using an average of the pixel values at the same location of the previous and the next frames. If the video does not have the repetition pattern and does not change fast, the video is interpolated using the motion vector of the previous and the next frames.

The frame interpolating method according to the present invention comprises the steps of setting a block for the previous frame and the next frame, searching for a matching block by performing the SAD mapping calculation, determining whether the inputted video signal has the repetition pattern, and interpolating the video with the pixel value of the previous frame if it is determined that the video signal has the repetition pattern.

Also, the frame interpolating method further comprises the steps of extracting the motion vector if it is determined that the video signal does not have the repetition pattern, determining whether the inputted video signal is the fast changing video by using the motion vector, and if it is determined to be the fast changing video, interpolating with the average of the pixels at the same locations of the previous and the next frames.

In an exemplary embodiment, if the video is not determined to be the fast changing video, a step of interpolating it using the motion vector is further included.

BRIEF DESCRIPTION OF THE DRAWINGS

The above aspects, and other features and advantages of the present invention will become more apparent after a reading of the following detailed description when taken in conjunction with the drawings, in which.

DETAILED DESCRIPTION OF THE EXEMPLARY EMBODIMENTS

Hereinafter, the present invention will be described with reference to the attached drawings.

Figure 1:
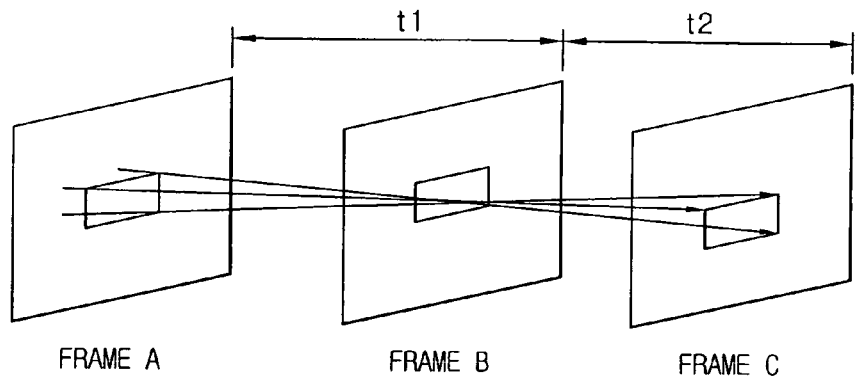
FIG. 1 is a diagram showing a conventional symmetrical Block Matching Algorithm.
Figure 2:
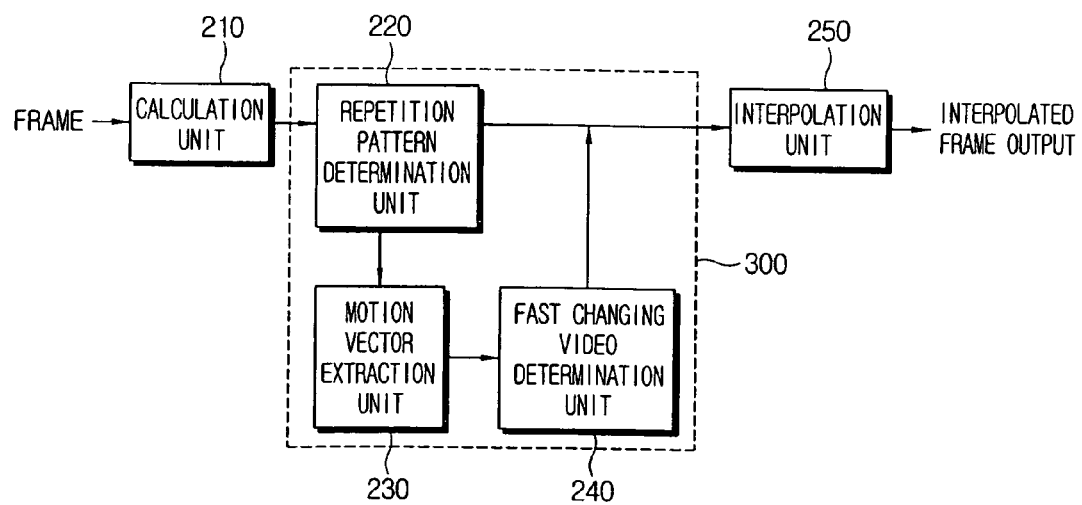
FIG. 2 is a block diagram schematically showing a configuration of a frame interpolating apparatus according to the present invention.

FIG. 2 is a block diagram schematically showing a configuration of a frame interpolating apparatus according to the present invention, which includes a calculation unit 210, a determination unit 300, and an interpolation unit 250. The determination unit 300 is a conceptual unit which represents a system that includes a repetition pattern determination unit 220, a motion vector extraction unit 230, and a fast changing video determination unit 240. As the present invention relates to a frame interpolating method and an apparatus thereof, configuration of other parts of frame interpolation is not illustrated.

The calculation unit 210 sets a search area of a certain size of a previous frame and a next frame based on a block of a certain size, and calculates Sum of Absolute Difference (SAD) within the search area. The SAD value is obtained by Equation 1. The calculation unit 210 compares the SAD value and determines optimum block matching when having the least SAD value. For this, the full search algorithm or the 3-Step search algorithm can be used.

The repetition pattern determination unit 220 compares the matching blocks and determines whether the video is repetitive or not. For the determination, a repetition pattern recognition algorithm may be used. As an exemplary embodiment of the repetition pattern recognition algorithm, the 3-Step repetition pattern recognition algorithm will be described. The first step of this algorithm is a Diagonal Map Distance, in which a Mean Absolute Error (MAE) MAP is obtained by adding absolute difference of each corresponding pixel with respect to the block of the frame, and if a diagonal distance which represents a sum of difference of MAE data on a diagonal line has a threshold greater than a predetermined value, the repetition pattern determination unit 220 recognizes it as a potential repetition pattern. The second step is a MAE MAP Classification, in which the MAE MAP is divided into small blocks and if a MAE Ratio (Max/Min) value of each small block is distributed particularly focused around the diagonal line or horizontal/vertical line, the repetition pattern determination unit 220 recognizes it as an analogous repetition pattern and excludes it from the repetition pattern. The third step is a Modified Median Filtering, in which the repetition pattern determination unit 220 recognizes the repetition pattern video only if blocks of more than a predetermined number have repeatability among adjacent blocks (for example, 3×3 block), in consideration of the fact that repetitive videos are generally aggregated, i.e., considering auto-correlativity of the adjacent blocks. Hence, using the above algorithm, the repetitive characteristics of the video is determined.

Upon recognizing the repetition pattern, the repetition pattern determination unit 220 sends a signal to the interpolation unit 250. The interpolation unit 250 uses the pixel value of the same pixel in the previous frame and interpolates accordingly.

If the video is determined not to have the repetition pattern in the repetition pattern determination unit 220, the motion vector extraction unit 230 extracts an optimum motion vector from the SAD values of the previous and the next frames. In this embodiment, the optimum motion vector is a motion vector of the least SAD value.

The fast changing video determination unit 240 uses the motion vector extracted by the motion vector extraction unit 230 to determine whether it is a fast changing video or a normal video. That is, if the motion vector is greater than a predetermined level, it is recognized as the fast changing video. Otherwise, it is recognized as the normal video.

The interpolating unit 250 changes the pixel value of the interpolated frame according to the determination result in the determination unit 300 and accordingly interpolates.

Figure 3:
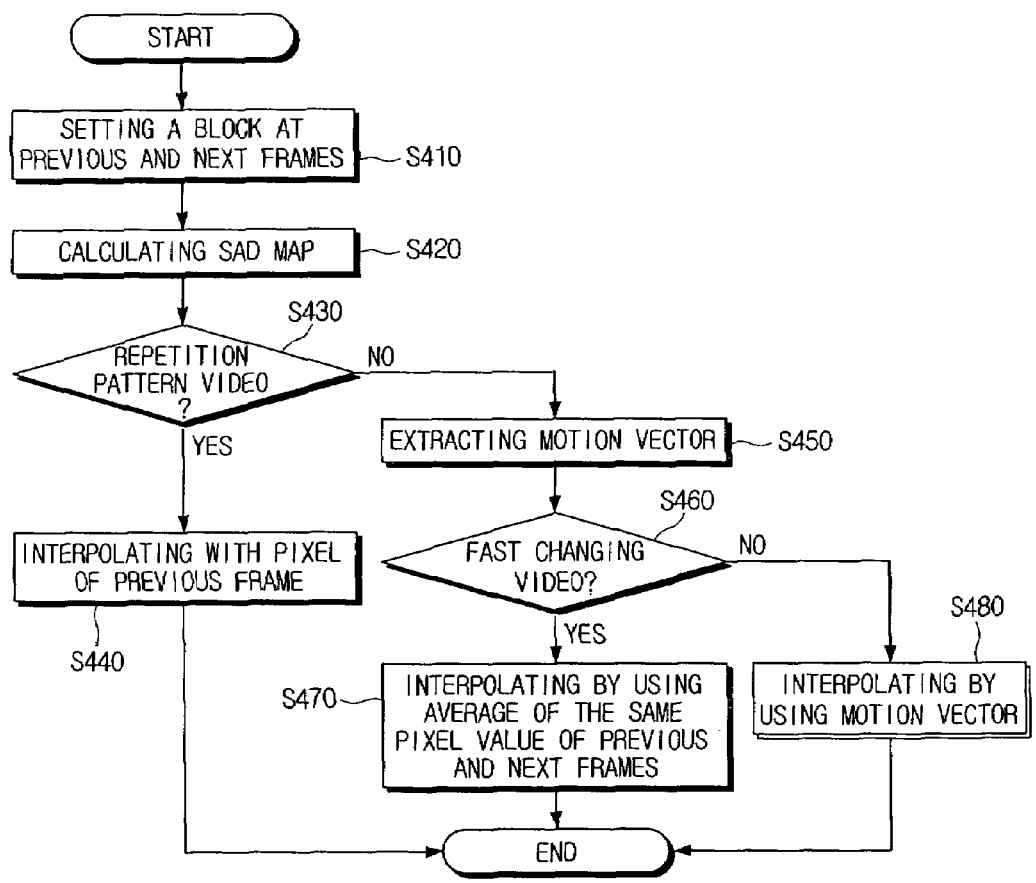
FIG. 3 is a flow chart showing a frame interpolating method.

FIG. 3 is a flow chart showing an algorithm for the frame interpolating method at frame rate conversion according to the present invention. As shown in FIG. 3, in step 410, a block of a certain size is set on the previous frame and the next frame of the interpolated frame, respectively.

In step 420, a search area having a certain size is set based on the block and the SAD is calculated within the search area. By comparing the SAD, blocks having the least SAD value are determined to be optimum block matching.

In step 430, by using the conventional repetition pattern recognition algorithm, video between the matching blocks of the previous frame and the next frame is compared and accordingly, it is determined whether the video is repetitive or not. The repetition pattern recognition algorithm is a well-known technology and detailed description thereof will be omitted.

If the video is determined to be repetition pattern video in the previous step 430, the interpolation unit 250 interpolates in step 440 by setting a value of pixel I in a frame to be interpolated to a value of pixel A that is at the same location of the previous frame, and then the frame interpolation process ends.

If the video is determined not to be repetition pattern video in step 430, a motion vector is extracted in step 450. The motion vector is obtained using the SAD value as aforementioned.

In step 460, it is determined whether the video is a fast changing video. That is, it is determined whether the motion vector extracted in step 450 is greater than a predetermined level. If so, the video is recognized as the fast changing video. This recognition procedure may be processed according to the conventional fast changing recognition algorithm as in the repetition pattern video.

If it is determined to be the fast changing video, in step 470, the interpolation unit 250 interpolates by setting a value of pixel I in a frame to be interpolated to an average value of pixel A and pixel B that are in the same locations in the previous and the next frames. If it is determined to be a normal video which does not change fast, the interpolation unit 250 interpolates using a motion vector from pixel C to pixel D in step 480.

Figure 4A:
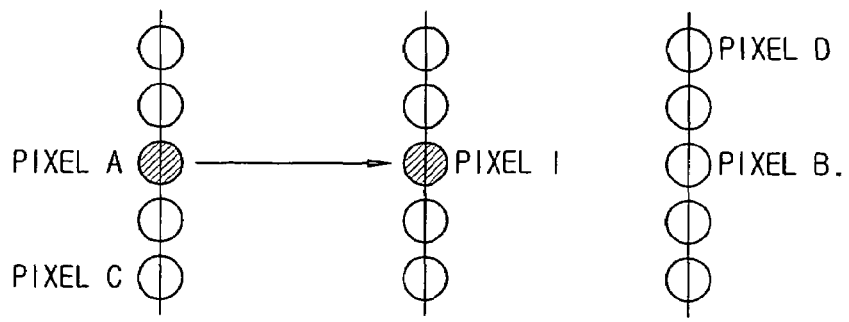
FIGS. 4A, 4B and 4C are diagrams respectively showing interpolating methods for an iterative video, a fast changing video, and a normal video.
Figure 4B:
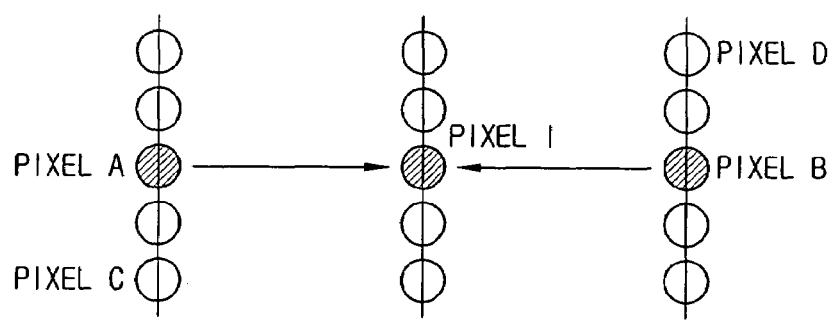
Figure 4C:
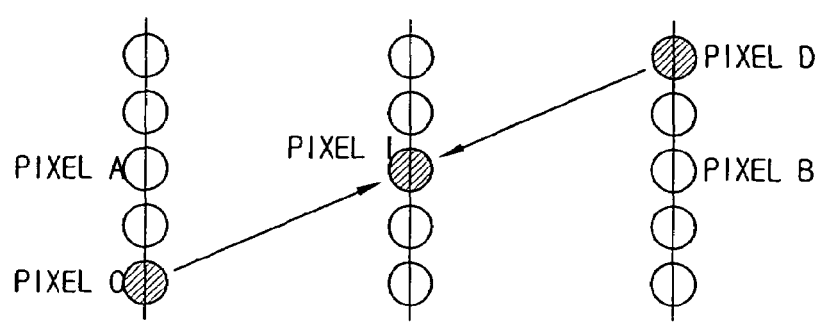

FIGS. 4A to 4D are diagrams for showing the interpolation process. In each of the figures, the left, center, and right lines indicate a previous frame, an interpolated frame and a next frame, respectively. Circles aligned on the lines indicate a separate pixel on the frame. FIG. 4A shows the interpolation method in the case of the repetition pattern, in which pixel I of the interpolated frame is interpolated to a value of pixel A at the same location of the previous frame. Meanwhile, FIG. 4B shows the interpolation method in the case of the fast changing video, in which pixel I of the interpolated frame is interpolated to an average value of pixel A and pixel B that are in the same location in the previous frame and the next frame, respectively. FIG. 4C shows the interpolation method in the case of the normal video, in which pixel I is interpolated using a motion vector between the frames. That is, the interpolation is performed using a motion vector $MV_{BA}$ from frame B (interpolated frame) to frame A (previous frame) and a motion vector $MV_{BC}$ from frame B to frame C (next frame).

Figure 5A:
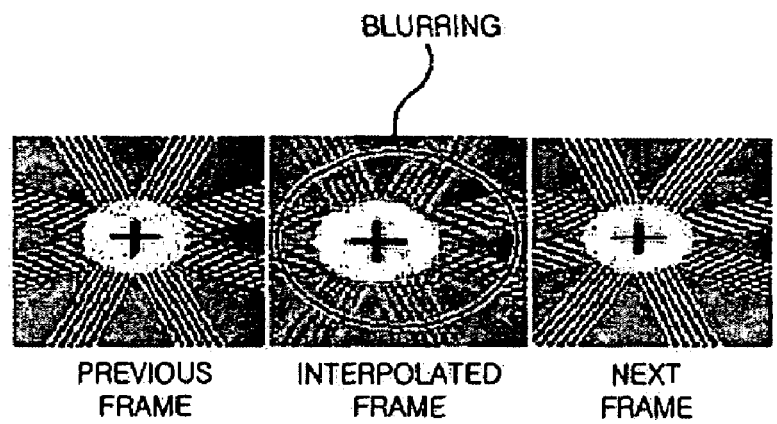
FIG. 5A is diagram showing a simulation result with respect to the repetitive video according to a conventional interpolating method.
Figure 5B:
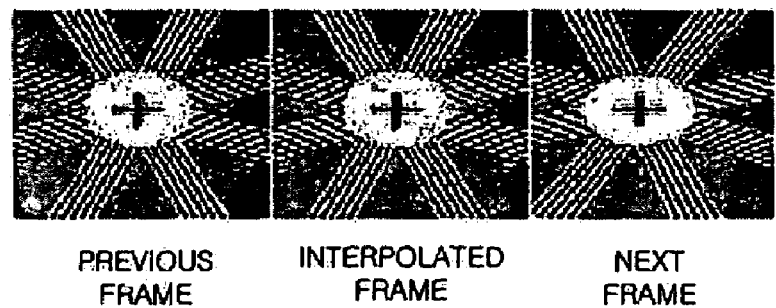
FIG. 5B is a diagram showing a simulation result of the interpolating method with respect to the repetitive video according to the present invention.

If the repetition pattern video is interpolated using a pixel value at the same location of a previous frame according to the present invention, blurring does not occur. FIGS. 5A and 5B compare simulation results of an interpolated video according the conventional method (FIG. 5A) and an interpolated video according to the present invention (FIG. 5B). As shown in FIG. 5A, blurring obviously occurs in the interpolated frame. To the contrary, the interpolated video is relatively vivid and clear in FIG. 5B.

In the meantime, the effect of the interpolation method according to the present invention becomes more apparent by comparing Peak Signal to Noise Ratio (PSNR) which is obtained using Mean Square Error (MSE). The MSE is obtained using a pixel value f1 (i, j) of the previous frame and a pixel value f2 (i, j) of the next frame, and then the PSNR is obtained using the MSE as below.

$$MSE = \frac{1}{MN} \sum_{i=0}^{M-1} \sum_{j=0}^{N-1} (|f_2(i, j) - f_2(i, j)|^2) \qquad \text{[Equation 5]}$$

$$PSNR = 20 \log_{10}\left(\frac{255}{\sqrt{MSE}}\right)$$

Wherein, M denotes a width of the block and N denotes a length of the block. Data obtained by Equation 5 is as below.

TABLE 1

|  | repetition pattern video is interpolated using the motion vector | repetition pattern video is interpolated using pixel average of the previous and the next frames | repetition pattern video is interpolated using pixel value itself of the previous frame |
|---|---|---|---|
| PSNR | 15.8 dB | 24.9 dB | 100 dB |

In Table 1, if the repetition pattern video is interpolated using a pixel value of the previous frame, that is, interpolated according to the present invention, the PSNR is highest. In the case when the repetition pattern video is interpolated using a pixel average of the previous and the next frames, the PSNR is higher than the case when the motion vector is used. However, compared to the case according to the present invention, the PSNR of the case using the pixel average is far lower.

According to the interpolating method according to the present invention, in the case of the repetition pattern video as shown in FIG. 4A, the pixel I of the interpolated frame is interpolated to a value $f_B(i, j) = f_A(i, j)$.

In the case of the fast changing video as shown in FIG. 4B, the pixel I is interpolated as below.

$$f_B(i, j) = \frac{t_2 \times f_A(i, j) + t_2 \times f_C(i, j)}{t_1 + t_2}$$

In the case of the normal video as shown in FIG. 4C, the pixel I of the interpolated frame is interpolated as below.

$$f_B(i, j) = \frac{t_2 \times f_A(i+dx_{BA}, j+dy_{BA}) + t_2 \times sf_C(i+dx_{BC}, j+dy_{BC})}{t_1 + t_2}$$

Accordingly, the normal video and the fast changing video are interpolated according to the conventional interpolating method, and the repetition pattern video is interpolated using the pixel value of the previous frame to thereby prevent blurring which has occurred while interpolating the repetition pattern video in the related art. The effect of the present invention is visually and numerically evident. That is, blurring occurring at the interpolated frame of FIG. 5A is removed completely as shown in FIG. 5B. Also, in comparing data of Table 1, in the case of the interpolating method according to the present invention, the PSNR of the repetition pattern video is even higher.

Although the exemplary embodiment of the present invention has been described, it will be understood by those skilled in the art that the present invention should not be limited to the described exemplary embodiment, but various changes and modifications can be made within the spirit and scope of the present invention as defined by the appended claims.

What is claimed is:

1. A frame interpolating apparatus used for converting a frame rate, comprising:
    a calculation unit performing a Sum of Absolute Difference (SAD) map calculation among inputted video signals with respect to a previous frame and a next frame, and performing block matching to output a block-matched frame;
    a determination unit determining from the block-matched frame whether a video is repeated periodically and/or changing fast; and
    an interpolation unit selectively calculating a pixel value of an interpolated frame according to a determination result of the determination unit,
    wherein if the video has a repetition pattern, the interpolation unit interpolates the video using a pixel value of the previous frame.

2. The frame interpolating apparatus of claim 1, wherein the determination unit further comprises:
    a repetition pattern determination unit determining whether the video has a repetition pattern by using a SAD value;
    a motion vector extraction unit calculating a motion vector through the SAD value; and
    a fast changing video determination unit determining whether the video is a fast changing video by using a value of the motion vector.

3. The frame interpolating apparatus of claim 2, wherein if the video does not have the repetition pattern but changes fast, the interpolation unit interpolates the video using an average of pixel values of pixels at same locations of a previous frame and a next frame.

4. The frame interpolating apparatus of claim 2, wherein if the video does not have the repetition pattern and does not change fast, the interpolation unit interpolates the video using the motion vector of the previous frame and the next frame.

5. The frame interpolating apparatus of claim 1, wherein the determination unit determines whether the video is changing fast, if a motion vector is greater than a predetermined level.

6. The frame interpolating apparatus of claim 1, wherein the determination unit determines whether the video repeats periodically by using a repetition pattern recognition algorithm.

7. A frame interpolating method, comprising the steps of:
    setting a block for a previous frame and a next frame;
    searching for a matching block by performing a Sum of Absolute Differences (SAD) mapping calculation;
    determining whether a video signal of the matching block has a repetition pattern; and
    if it is determined that the video signal has the repetition pattern, interpolating with a pixel value of the previous frame.

8. The frame interpolating method of claim 7, further comprising the steps of:
    if it is determined that the video signal does not have the repetition pattern, extracting a motion vector;
    determining whether the video signal is a fast changing video by using the motion vector; and
    if the video signal is determined to be the fast changing video, interpolating with an average of pixels at same locations of the previous frame and the next frame.

9. The frame interpolating method of claim 8, further comprising the step of:
    if the video signal is not determined to be the fast changing video, interpolating by using the motion vector.

10. A frame interpolating apparatus used for converting a frame rate, comprising:
    a calculation unit comparing inputted video signals with respect to a previous frame and a next frame to output a differential value, and performing block matching to output a block-matched frame;
    a determination unit determining from the block-matched frame whether a video is repeated periodically and/or changing fast; and
    an interpolation unit selectively calculating a pixel value of an interpolated frame according to a determination result of the determination unit,
    wherein if the video has a repetition pattern, the interpolation unit interpolates the video using a pixel value of the previous frame.

11. The frame interpolating apparatus of claim 10, wherein the determination unit further comprises:
    a repetition pattern determination unit determining whether the video has a repetition pattern by using the differential value;
    a motion vector extraction unit calculating a motion vector through the differential value; and
    a fast changing video determination unit determining whether the video is a fast changing video by using a value of the motion vector.

12. The frame interpolating apparatus of claim 11, wherein if the video does not have the repetition pattern but changes fast, the interpolation unit interpolates the video using an average of pixel values of pixels at same locations of a previous frame and a next frame.

13. The frame interpolating apparatus of claim 11, wherein if the video does not have the repetition pattern and does not change fast, the interpolation unit interpolates the video using the motion vector of the previous frame and the next frame.

14. The frame interpolating apparatus of claim 10, wherein the determination unit determines whether the video is changing fast, if a motion vector is greater than a predetermined level.

15. The frame interpolating apparatus of claim 10, wherein the determination unit determines whether the video repeats periodically by using a repetition pattern recognition algorithm.

16. A frame interpolating method, comprising the steps of:
 setting a block for a previous frame and a next frame;
 searching for a matching block;
 determining whether a video signal of the matching block has a repetition pattern; and
 if it is determined that the video signal has the repetition pattern, interpolating with a pixel value of the previous frame.

17. The frame interpolating method of claim 16, further comprising the steps of:
 if it is determined that the video signal does not have the repetition pattern, extracting a motion vector;
 determining whether the video signal is a fast changing video by using the motion vector; and
 if the video signal is determined to be the fast changing video, interpolating with an average of pixels at same locations of the previous frame and the next frame.

18. The frame interpolating method of claim 17, further comprising the step of:
 if the video signal is not determined to be the fast changing video, interpolating by using the motion vector.

* * * * *